(No Model.)
F. M. ASHLEY.
BRAKE SYSTEM.
No. 587,690. Patented Aug. 10, 1897.
Fig. 1.
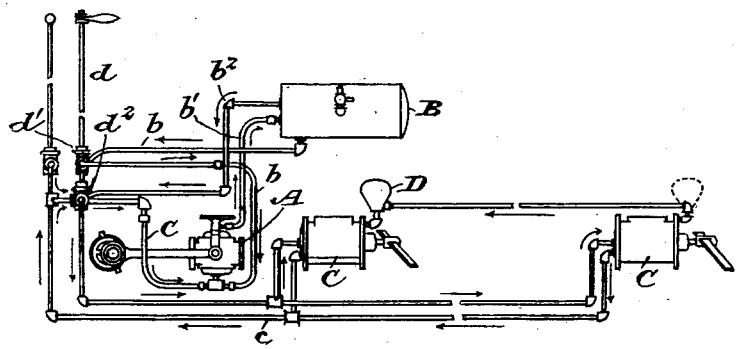
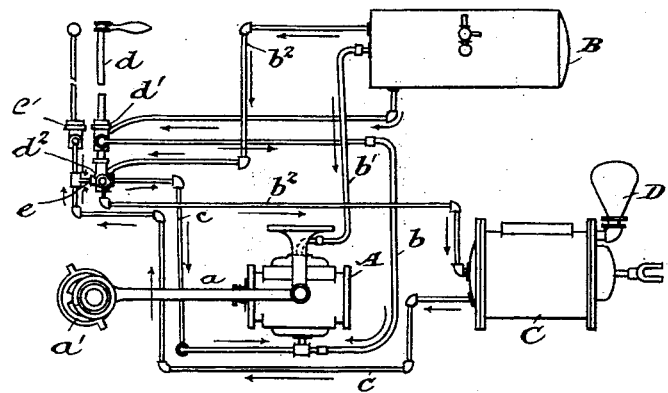
Fig. 2.
Witnesses:
E. B. Bolton
George A. Ryan
Inventor:
Frank M. Ashley
By Edwards, Ryan & Lawyer
his Attorneys.

UNITED STATES PATENT OFFICE.

FRANK M. ASHLEY, OF HAWTHORNE, NEW JERSEY.

BRAKE SYSTEM.

SPECIFICATION forming part of Letters Patent No. 587,690, dated August 10, 1897.

Application filed June 18, 1895. Serial No. 553,206. (No model.)

*To all whom it may concern:*

Be it known that I, FRANK M. ASHLEY, a citizen of the United States, and a resident of Hawthorne, in the county of Passaic and State of New Jersey, have invented certain new and useful Improvements in Brake Systems, of which the following is a specification.

This invention relates to air or fluid pressure brakes for use on railway-cars or elsewhere; and its object is to provide a brake system which shall be strong and positive in action, flexible, and extremely simple in construction and operation. It will be described in detail with reference to the accompanying drawings, in which—

Figure 1 is a perspective view of my improved system; and Fig. 2 is a similar view, the same being applied to one car only.

In the drawings, A represents an air or fluid pump mounted on the car and operated by a piston-rod $a$, moved by a cam $a'$ on the axle of the car. I prefer to mount the pump and construct the piston-rod and cam in the manner heretofore described by me in my application for patent, filed June 18, 1895, Serial No. 553,205, although any other suitable construction would suffice.

B is a reservoir connected with the outlet of the pump by a pipe $b'$. The reservoir is also provided with a safety-valve, for a purpose which will more fully hereinafter appear. A pipe $b^2$ leads from the reservoir to the brake-cylinder C, a pipe $b'$ leads from the pump to the reservoir, and from the brake-cylinder a pipe $c$ leads to the inlet of the pump. A valve $c'$ controls an opening from pipe $c$ into the outside atmosphere to permit air to be introduced into the system, as will be hereinafter described. At a convenient point where pipes $b'$, $b^2$, and $c$ approach each other is a valve-stem $d$, operating simultaneously valves $d'$, $d^2$, and $e$, located, respectively, in pipes $b$, $b^2$, and $c$. These valves are so moved with respect to each other that when valve $d'$ is opened valve $d^2$ will be closed and valve $e$ opened, and when valve $d'$ is closed valve $d^2$ will be opened and valve $e$ closed.

The end of the brake-cylinder opposite that connected with pipes $b^2$ and $c$ has an opening into a compression-chamber D, whereby whenever the brakes are applied the piston in the brake-cylinder will in its forward movement compress the air in that end of the cylinder into the chamber, and when the brake-applying pressure ceases the compressed air in chamber D will expand and cause a backward movement of the piston, thus releasing the brakes. In place of providing these compression-chambers a spring or other equivalent device may be placed in the end of the brake-cylinder to throw off the brakes.

In operation the system works substantially as follows: Valve $d'$ is turned to open position, thereby closing valve $d^2$. Valve $c'$ is then opened, and air from the outside atmosphere is pumped into the system until a pressure of, say, one hundred pounds is reached. The valve is then closed and ingress and egress of air from the outside atmosphere are cut off. When the car starts to move, pump A will be operated and a circulation of the atmosphere will be established from reservoir B through pipe $b$, valve $d'$, pipe $b$, pump A, pipe $b'$, and back into reservoir B. Pump A will also draw air from brake-cylinder C through pipe $c$, valve $e$, pipe $c$, pump A, and thence force it through pipe $b'$ back into reservoir B, thus exhausting any air that may be in that end of the brake-cylinder. The expansion of air in the compression-chamber D will then throw off the brakes, as heretofore described. To apply the brakes, the engineer turns the valve-stem $d$ to close valve $d'$. This opens valve $d^2$ and closes valve $e$. The pump can then draw no more air from the brake-cylinder through pipe $c$, nor will it draw any air from the reservoir through pipe $b'$. The only passage through which the air can escape from the reservoir B, in which the air is stored under pressure, is through pipe $b^2$, valve $d^2$, which is open, pipe $b^2$, and into the brake-cylinder, and there being no escape of air from the brake-cylinder the brake will be applied.

In filling the reservoir B with air it is only necessary to open valve $c'$ and turn the valve-stem $d$ to such a position that valve $e$ will be opened. The pump is then put in operation and the air is pumped from the outside atmosphere directly into the reservoir, It is obvious that although the system has been described as employing air-pressure any compressible fluid can be used therein.

Having thus described my invention, I claim—

1. In a brake system, the combination with the brake cylinder and piston, of a chamber in open communication with one end of said cylinder, whereby when the piston is driven in the direction of said chamber the fluid therein is compressed and exerts a counter-pressure upon said piston, and means for creating a vacuum, or substantially so, on the opposite side of said piston to release the brakes, substantially as described.

2. In a brake system, the combination with the brake cylinder and piston, of a chamber in open communication with one end of said cylinder, whereby when the piston is driven in the direction of said chamber the fluid therein is compressed and exerts a counter-pressure upon said piston, and a pump communicating with said cylinder and adapted to withdraw pressure from the opposite side of said piston, to release the brakes, substantially as described.

3. In a brake system, the combination of a reservoir containing fluid under pressure, a brake-cylinder communicating therewith, means for closing said communication, a pump adapted to withdraw said fluid-pressure from said brake-cylinder to release the brakes, means for preventing said withdrawal, and a chamber in open communication with the opposite end of said brake-cylinder, whereby when the piston of said cylinder is driven in the direction of said chamber the fluid therein is compressed and exerts a counter-pressure upon said piston, substantially as described.

4. In a brake system, the combination of a reservoir containing fluid under pressure, a brake-cylinder communicating therewith, a pump connected with said brake-cylinder and discharging into said reservoir, means for closing communication between the pump and brake-cylinder, and a chamber in open communication with the opposite end of said brake-cylinder whereby when the piston of said cylinder is driven in the direction of said chamber the fluid therein is compressed and exerts a counter-pressure upon said piston, substantially as described.

5. In a brake system, the combination of a pump, brake-cylinder and reservoir, a system of circulation under pressure adapted to flow through pipes leading respectively from the pump to the reservoir, the reservoir to the pump, the reservoir to the cylinder and the cylinder to the pump, and means for closing communication between said reservoir and pump, reservoir and cylinder and cylinder and pump, said means being so arranged that when communication is closed between the reservoir and cylinder, communication between the cylinder and pump and reservoir and pump will be open, and vice versa, substantially as described.

6. In a brake-system, the combination of the pump, brake-cylinder and reservoir, a pipe connecting said reservoir with the outlet of said pump, a second pipe connecting said reservoir with the inlet of said pump, a third pipe connecting said reservoir with one end of said brake-cylinder and a fourth pipe connecting the same end of the brake-cylinder with the inlet of the pump, and a valve or valves in said pipes whereby when communication from the reservoir to the brake-cylinder is open, communication from the brake-cylinder to the pump and from the reservoir to the pump will be closed, substantially as described.

Signed at New York, in the county of New York and State of New York, this 9th day of April, A. D. 1895.

FRANK M. ASHLEY.

Witnesses:
EDWARD K. STURTEVANT,
C. V. EDWARDS.